Patented June 29, 1926.

1,590,915

UNITED STATES PATENT OFFICE.

MARY ELIZABETH STEWART, OF CINCINNATI, OHIO.

COMPOSITION OF MATTER FOR REMOVING INCRUSTATIONS.

No Drawing.   Application filed August 25, 1924.   Serial No. 734,074.

This invention relates to compositions of matter for removing incrustations.

The invention has as its object to provide a composition of matter which may be employed with great effectiveness in removing boiler scale and other incrustations from boilers, and which may likewise be employed in removing carbon from the cylinders of gas engines and the spark plugs associated with the said cylinders.

The composition consists of an intimate mixture of the following ingredients in substantially the proportions stated:

|                | Pounds. |
|---|---|
| Gum japonica   | 50 |
| Sal soda       | 40 |
| Sugar of lead  | 3  |

Where the composition is to be employed for the purpose of removing scale and other incrustations from boilers, approximately fifty gallons of water will be employed in connection with the solid ingredients and approximately one gallon of the mixture is introduced into the boiler after the boiler has been as thoroughly cleaned as possible, and the boiler may then be put in operation. After the boiler has been in operation one or more days after the introduction of the initial quantity of the composition, one quart of the mixture is preferably pumped into the boiler each day. The employment of the solid ingredients mixed with water is a convenient mode of utilizing the composition for the purpose stated, although, if desired, a suitable quantity of the powdered composition without admixture with water, may be introduced directly into the boiler. However, it is preferable to employ the fluid composition.

In employing the composition for the purpose of removing carbon from gas engine cylinders, the greater proportion of water, namely sixty gallons, is mixed with the solid ingredients, and the liquid mixture thus obtained is then ready for use. In practice, approximately two tablespoonsful of the mixture will be introduced into each cylinder of the engine, preferably after the engine has been run for a sufficient period of time to become properly heated, and the engine is then left to stand over night and the following morning is run idle so as to discharge, through the exhaust, all of the dissolved or loosened carbon removed from the walls of the cylinders and from the spark plugs, by the composition.

Having thus described the invention, what I claim is:

1. A composition of matter consisting of a mixture of sugar of lead, sal soda, and gum japonica.

2. A composition for removing incrustations from boilers consisting of a mixture of approximately fifty parts by weight of gum japonica, forty parts by weight of sal soda, and three parts by weight of sugar of lead.

In testimony whereof I affix my signature.

MARY ELIZABETH STEWART. [L. S.]